(12) United States Patent
Wise et al.

(10) Patent No.: US 6,445,344 B1
(45) Date of Patent: Sep. 3, 2002

(54) LOCAL AREA POSITIONING SYSTEM

(75) Inventors: Carl D. Wise, Severna Park; Norman F. Powell, Ellicott City; Clinton W. Moulds, Millersville; David R. Iny, Baltimore, all of MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 25 days.

(21) Appl. No.: 09/709,299

(22) Filed: Nov. 13, 2000

Related U.S. Application Data

(60) Provisional application No. 60/165,660, filed on Nov. 16, 1999.

(51) Int. Cl.[7] ................................................. G01S 3/02
(52) U.S. Cl. ........................ 342/458; 342/450; 342/463
(58) Field of Search ................................ 342/450, 457, 342/458, 431, 462, 463, 357.08, 357.09, 357.1

(56) References Cited

U.S. PATENT DOCUMENTS

| | | | |
|---|---|---|---|
| 4,114,155 A | | 9/1978 | Raab |
| 4,445,118 A | | 4/1984 | Taylor et al. |
| 5,450,329 A | * | 9/1995 | Tanner .................. 342/357.09 |
| 5,543,804 A | | 8/1996 | Buchler et al. |
| 5,923,294 A | * | 7/1999 | Bacelon et al. ............. 342/457 |
| 5,991,691 A | | 11/1999 | Johnson |
| 6,094,163 A | | 7/2000 | Chang |
| 6,133,873 A | | 10/2000 | Krasner |
| 6,134,484 A | | 10/2000 | Geier et al. |

OTHER PUBLICATIONS

"Applied Optimal Estimation", The Analytic Sciences Corporation, Arthur Gelb et al., The M.I.T. Press, Eleventh Printing, 1989, pp. 106–119.

"Understanding GPS Principles and Applications", Elliot D. Kaplan, Editor, 1996 Artech House, Inc., pp 261–269.

* cited by examiner

*Primary Examiner*—Thomas H. Tarcza
*Assistant Examiner*—Fred H Mull

(57) ABSTRACT

A local area positioning system which includes a plurality of platforms or nodes consisting of airborne and/or ground based vehicles that are coupled in a platform-to-platform local area network. The platforms themselves establish a spatial reference system for location and communication between platforms is accomplished using directive millimeter wave beams, and where measurements and communicated estimates of node locations, in a local inertial reference frame, are processed via Kalman tracking filters to generate updated estimates of position and velocity vectors associated with each node.

13 Claims, 3 Drawing Sheets

LOCAL AREA POSITIONING SYSTEM

This application claims the benefit of U.S. provisional application No. 60/165,660, filed Nov. 16, 1999.

BACKGROUND OF THE INVENTION

1. Field of the Invention

This invention relates generally to navigation systems and more particularly to a system which uses a locally generated coordinate frame for determining the position of a platform relative to a plurality of other platforms operating within a common spatial reference system.

2. Description of Related Art

Current navigation/location systems both military and civilian, rely heavily on GPS satellite signals as the basis for locating entities in an earth reference frame. The currently used global positioning system (GPS) consists of 24 globally dispersed satellites which enables a user to obtain his position and velocity in space by sensing coded signals from a predetermined number, typically four, of viewable satellites. This system, moreover, is well documented and reference, if need be, can be made to U.S. Pat. No. 4,114,155 entitled "Position Determining Apparatus And Method" or to a publication entitled *Understanding GPS: Principles and Applications*, Elliot D. Caplan, Artech House, Boston, 1996.

However, there are growing concerns over GPS vulnerability to jamming and reduced reliability of operation when the communication path to available satellites are blocked by terrain or buildings. The basis for these concerns regarding military systems is manifestly obvious. However, these concerns also apply to civilian systems. For example, GPS is not employed as an aid to civilian aircraft landing systems because of its implicit vulnerability to jamming by a terrorist or some other entity. Similarly, a concern regarding the potential denial of GPS by terrain or buildings is the same for civilian and military applications. Accordingly, a new system approach is needed that provides not only a backup navigation/location capability under the conditions where GPS signals are not available, but also one which can operate entirely independently of a satellite navigation system such as GPS.

SUMMARY

It is an object of the present invention, therefore, to provide a system for generating extremely high accurate positional information of a sensor platform.

It is another object of the invention to provide a system for generating highly accurate position information regarding the relative location of a plurality of sensor platforms within a spatial reference system.

It is yet another object of the invention to provide a system which provides three dimensional location of a plurality of sensor platforms within a local area coordinate frame using directive beams.

It is still another object of the present invention to provide a highly accurate local area positioning system which can operate without reliance on external systems such as a satellite navigation system.

These and other objects are achieved by a local area positioning system (LAPS) which utilizes networking as an expedient to enhancing capabilities associated within a given platform, also referred to as a node, in a system which includes a plurality of platforms consisting of airborne and/or ground base vehicles that are coupled via a platform-to-platform local area network. The system is similar to GPS in that ranging is employed as a basis for locating the various platforms; however, the system of the subject invention differs from GPS in two respects: (1) the platforms themselves establish a spatial reference system for location; and, (2) communication between platforms is accomplished using directive millimeter wave beams, and where measurements and communicated estimates of node locations, in a local inertial reference frame, are processed via Kalman tracking filters to generate updated estimates of position and velocity vectors associated with each node.

Further scope of applicability of the present invention will become apparent from the detailed description provided hereinafter. It should be understood, however, that the detailed description and specific example, while disclosing the preferred embodiment of the invention, is given by way of illustration only, since various changes and modifications within the spirit and scope of the invention will become apparent to those skilled in the art from the following detailed description.

BRIEF DESCRIPTION OF THE DRAWING

The present invention will become more fully understood when the detailed description provided hereinbelow is considered together with the drawings which are provided by way of illustration only, and thus are not meant t be limitative of the invention, and wherein.

DETAILED DESCRIPTION OF THE INVENTION

Figure 1:
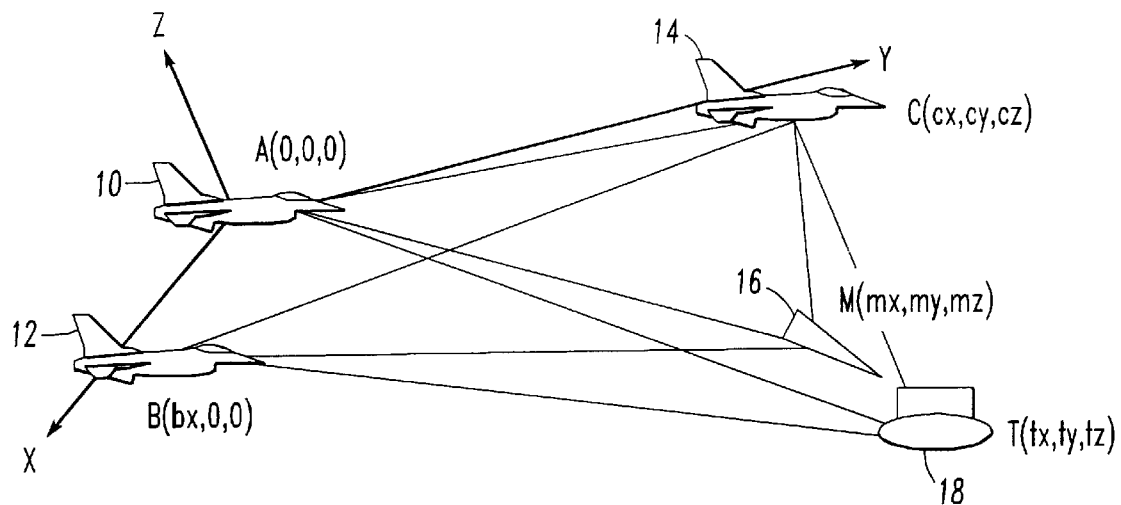
FIG. 1 is a diagram illustrative of a spatial reference coordinate system regarding to the subject invention including a plurality of nodes or platforms.

Referring now to the drawings and more particularly to FIG. 1, shown thereat is a diagram illustrative of a group of moving or stationary platforms or nodes A, B, C, M and T which are referenced to a common X, Y, Z orthogonal coordinate spatial reference system. The nodes A, B, and C are shown as being comprised of aircraft 10, 12, and 14, while the nodes M and T represent a weapon system 16 consisting of, for example, a missile and a ground based target 18. This is not shown in a limiting sense, since all the platforms could simply be a plurality of like or different airborne vehicles and/or a mix of stationary platforms or other type of moving ground vehicles.

The spatial arrangement of platforms and their respective coordinates provide a mathematical basis for making range and range rate measurements among the nodes using Kalman tracking filters in each node to generate updated estimates of position and velocity vectors associated with each node. If no other nodes of the network shown, for example, in FIG. 1 have known locations, the networking and processing among the individual nodes will produce a convergence to a floating coordinate frame having common but similar arbitrary position and coordinate references (x, y, z) within the X, Y, Z coordinate system.

If one of the nodes, for example the aircraft 10 shown in FIG. 1, is located in an earth reference frame, the network can be earth referenced with respect to the location of that node with rather arbitrary orientation of coordinate axes. If three or more of the nodes, for example the aircraft 10, 12 and 14 are at known locations in an earth reference frame such as North, East and Down, then the coordinates of the system can be accurately referenced and aligned to the (N, E, D) coordinate frame.

If a tracking system to be hereinafter described with reference to FIGS. 2–4 were to be implemented as a back-up to a GPS, the coordinate reference would logically be initialized to the GPS coordinate frame. In the event of jamming, it is possible that one or more of the nodes would not be jammed. In such an instance, the system of the subject invention could be adapted such that the jam-free node(s) would serve as stable references so that the system of the subject invention would maintain the GPS coordinate frame. For example, Global Hawks operating at high altitude would most likely be jam resistant and accordingly could be used as a stable reference. More importantly, the system of the subject invention can operate completely independent of GPS.

Figure 2:
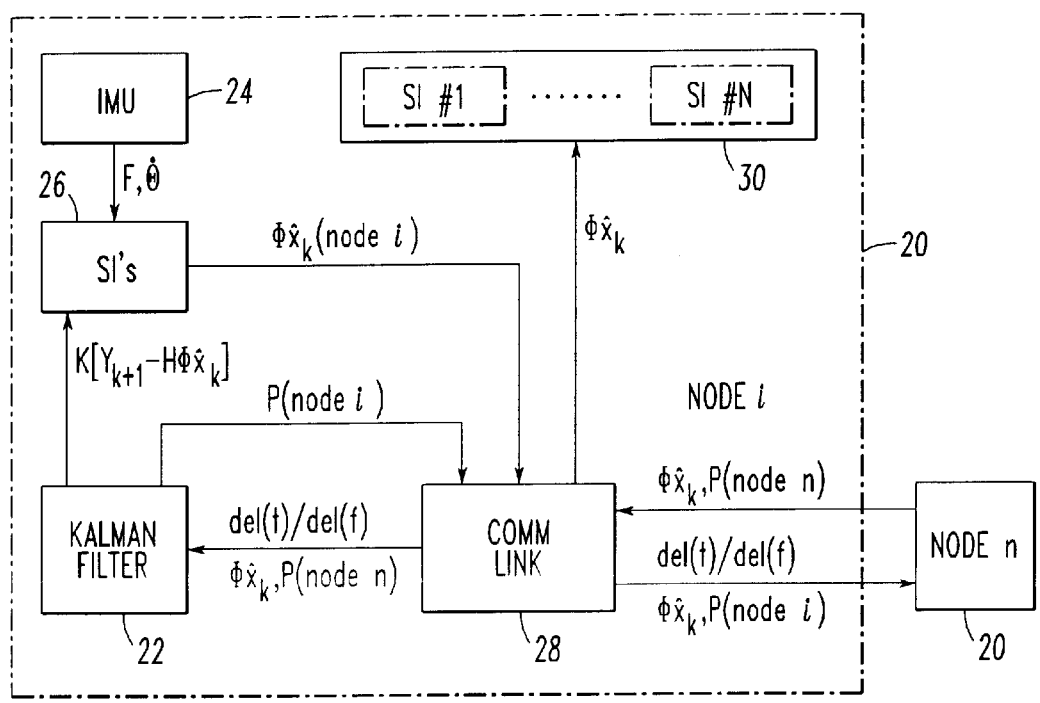
FIG. 2 is an electrical block diagram illustrative of a first embodiment of the invention for implementing a multi-platform tracking function.
Figure 3:
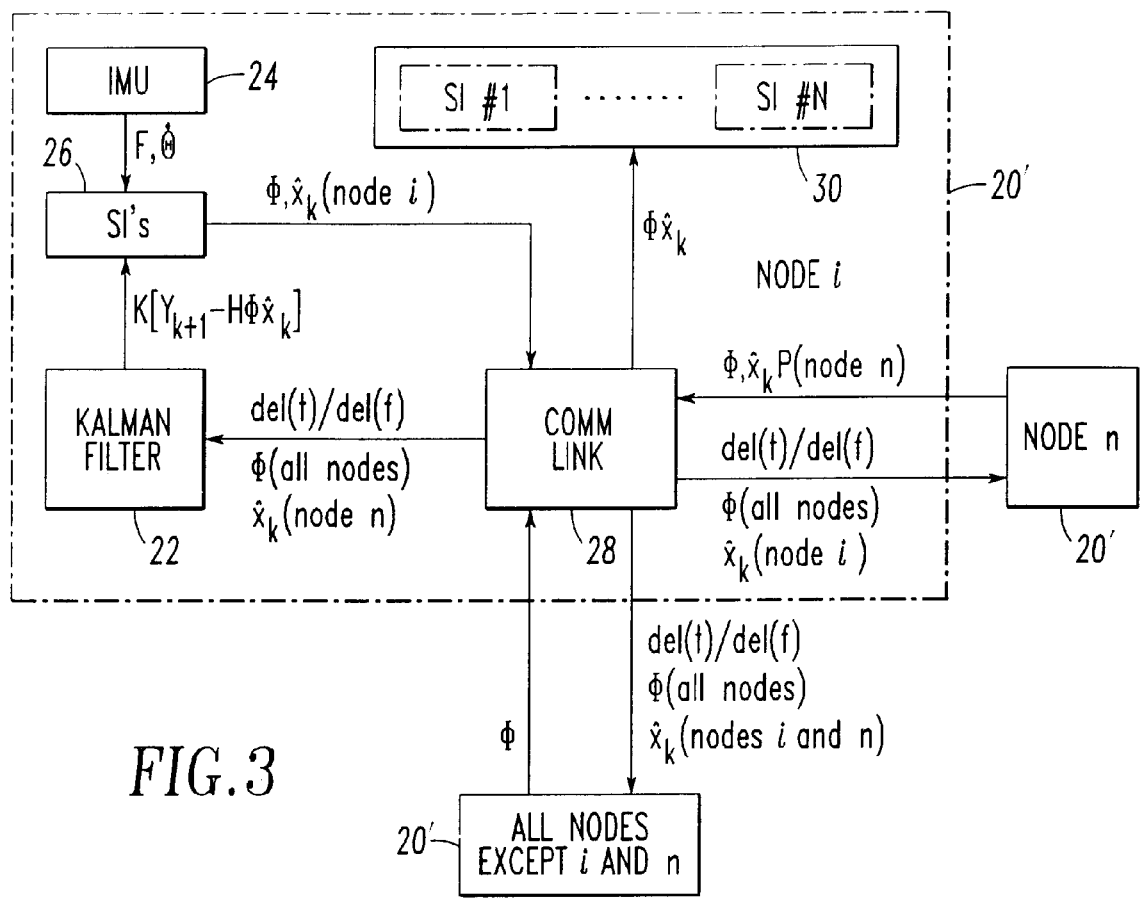
FIG. 3 is an electrical block diagram illustrative of a second embodiment of the subject invention.
Figure 6:
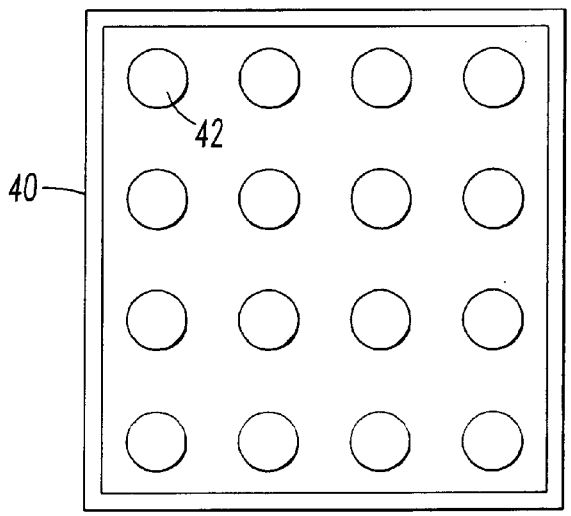
FIG. 6 is a diagram further illustrative of the antenna array shown in FIG. 5.
Figure 4:
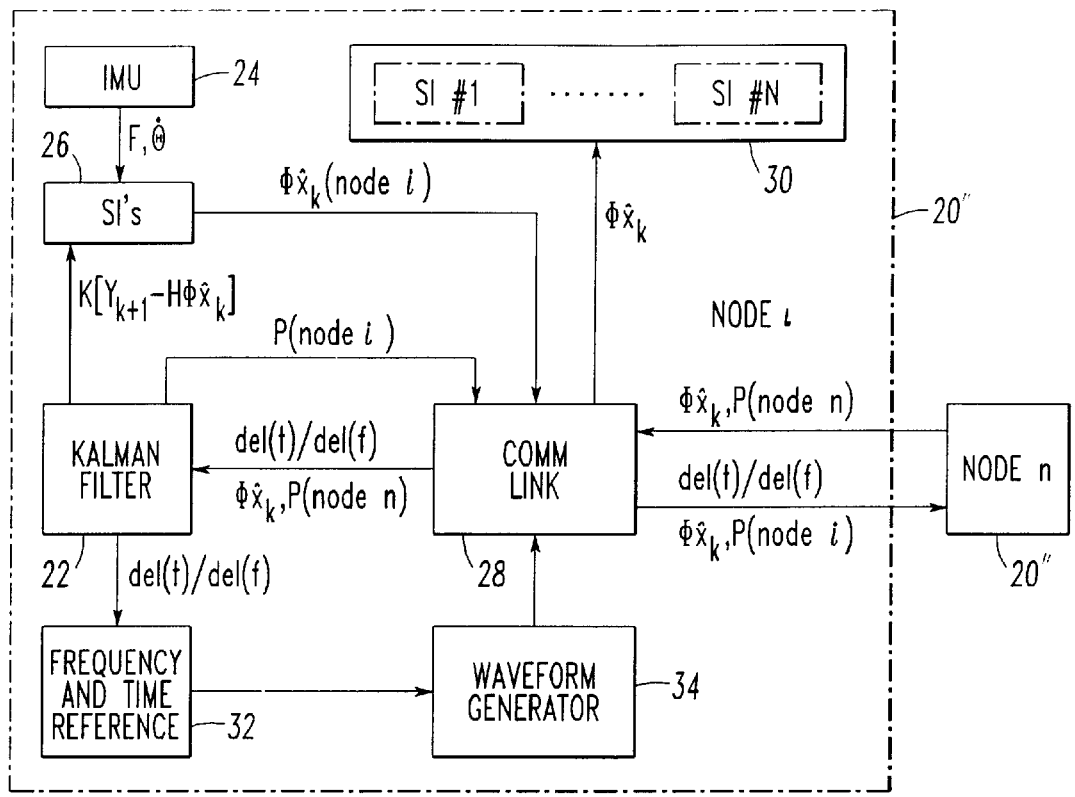
FIG. 4 is an electrical block diagram illustrative of a third embodiment of the subject invention.

In the subject invention, a multi-platform tracking function is implemented as a distributed system in which all nodes or platforms 1, 2, . . . n, shown, for example, by reference numerals 10, 12, 14, 16 and 18 in FIG. 1, include identical tracking apparatus as shown by the three embodiments shown in FIGS. 2, 3 and 4 by reference numerals 20, 20' and 20".

As shown in the first embodiment (FIG. 2), node i includes a Kalman filter 22, an inertial measurement unit (IMU) 24 which comprises a portion of an on-board inertial navigation system, a set of inertial referenced state integrators (SI's) 26 which actually form part of the Kalman filter 22, a communications link 28 and a second set of state integrators (SI's) 30. The second embodiment shown in FIG. 3 comprises an alternative to the first embodiment depicted in FIG. 2. The third embodiment shown in FIG. 4 additionally shows a node i designated by reference numeral 20" additionally including a frequency and time reference section 32 and a waveform generator 34.

In FIGS. 2 and 4, the measurement made between a pair of nodes (pairwise) at a specific time is used to "correct" the state integrators of these two nodes only. However, as time progresses, subsequent measurements involve different pairs of nodes. At each time of measurement, only the two nodes or node pairs involved in the measurement are "corrected" based on measurement between these nodes. In contrast, FIG. 3 assumes that all nodes networked are known ahead of time, and measurements between pairs of nodes are used to "correct" all state integrators, not just the two involved in the measurement as in FIG. 2. Thus, FIG. 3 takes advantage of statistical coupling of platform errors more accurately than FIGS. 2 and 4.

The heart of the tracking apparatus comprises the Kalman filter 22 which consists of a set of computations involving state estimate $\hat{x}_k$ and corresponding covariance P. Kalman filters are well known in the art and have been used extensively in navigation equipment and comprise a recursive algorithm that uses physical observations for measurements of, for example, range, angles, etc. to obtain an optimal estimate of desired navigational parameters. A Kalman filter depends on a previous state update, thus requiring little processing time and storage at each update and is thus well suited to real time applications involving microprocessors. A standard reference describing common filters is the textbook entitled *Applied Optimal Estimation*, Arthur Gelb, MIT Press, Cambridge, Mass., 1974, Chap. 4, pp. 107–119.

A Kalman filter state update can be expressed as:

$$\hat{x}_{k+1} = \Phi\hat{x}_k + K[y_{k+1} - H\Phi\hat{x}_k] \tag{1}$$

Applied to the subject invention, the definitions of the terms in equation (1) are as follows: the state vector $\hat{x}$ contains estimates of the position, velocity, and attitude angles of every platform or node 1 . . . n in the system; $\hat{x}_{k+1}$ is the value of the state vector estimate at time k+1; $\hat{x}_k$ is the value of the state vector estimate at the preceding time k; $\Phi$ is a state transition matrix that expresses the relationship for propagating the state estimate $\hat{x}_k$ forward in time to $\hat{x}_{k+1}$ before measurement incorporation; $y_{k+1}$ are measurements of range and range rate, for example, from a transponder between each platform at time k+1; H is an observation matrix that expresses the relationships between the measurements y and the state vector $\hat{x}$; and, K is a matrix of gains that is based on weighting the state variance P and measurement variances R.

Mathematically, the gain K is computed by the following expression:

$$K = PH[HPH^T + R]^{-1} \tag{2}$$

where the superscript T represents a transposition of the H matrix and −1 is indicative of the inverse of the term in brackets.

The covariance P is updated to reflect a new measurement by the expression:

$$P = [I - KH]P. \tag{3}$$

where I is an identity matrix.

Relating these definitions to the embodiment shown in FIG. 2, which is illustrative of a pairwise configuration, the output of the IMU 24 of, for example, node i includes specific force F and attitude rates $\dot{\theta}$. These are used within the SI's 26 to compute the state transition matrix $\Phi$ to propagate the state estimate $\hat{x}_k$ forward as $\Phi\hat{x}_k$. Thus, $\hat{x}_k$ comprises the position velocity, and attitude data for the $i^{th}$ platform (node i). Each node, however, maintains its own state estimate $\hat{x}_k$ and covariance matrix P. Thus, when a measurement is made between nodes i and n, the nodes must transfer their state and covariance estimates $\Phi\hat{x}_k$ and P to each other. Other pairs would do likewise. The covariance matrix P resides in the Kalman filter 22. The pairwise (node i and node n) state estimate is the augmentation of $\Phi\hat{x}_k$ at both platforms, and the covariance estimate is the block diagonal augmentation of P at both platforms.

The augmented state $\Phi\hat{x}_k$ and covariance P are used within the Kalman filter 22 to compute the Kalman gain K and state correction K $[y_{k+1} - H\Phi x_k]$ sent to the SI's 26. In addition, the Kalman filter 22 updates its internal estimate of the covariance matrix P. The measurement $y_{k+1}$ is embodied in del(t) corresponding to range and del(f) corresponding to range rate and generated, for example, by a transponder on the platform and passed to the Kalman filter 22 to compute the residual $y_{k+1} - H\Phi\hat{x}_k$. The communication link 28 also passes state information $\Phi\hat{x}_k$ to the set of SI's 30 for antenna pointing to be described hereinafter.

An alternative to the pairwise configuration of FIG. 2 is shown in FIG. 3. In this case, pairwise measurements between node pairs i and n as well as other node pairs are coupled among all the other nodes which are used to adjust the neighborhood ensemble navigation state of all the other nodes. Thus, a measurement between nodes i and n is used to make corrections in all of the other platforms in the system as well, by the statistical coupling of the navigation states. In addition, respective transition matrices Φ at each node are communicated to the other nodes to properly propagate the covariance matrix P. Thus, instead of communicating nodal estimates of P, the communication link 28 communicates the state transition matrix Φ to all nodes. Overall, more data is passed since pairwise measurements affect all navigation state integrators 26.

In the third embodiment shown in FIG. 4, a del(t)/del(f) output from the Kalman filter 22 is employed to also correct the time-frequency reference of section 32. In such a case, relative clock biases are added to the state vector $\hat{x}$ as additional states. Time of arrival measurements would then couple the relative range y with clock bias states.

In operation, the tracking apparatus 20 of each node or platform, shown for example in FIG. 1 as A, B, C and M, updates its position and velocity computations based upon range and range rate measurements to other nodes. That is, platform-to-platform range and range rate measurements associated with a given platform are applied to the respective Kalman filter 22 associated with that platform. The output of the Kalman filter 22 is used to update the respective set of inertial reference state integrators SI's 26 as the basis for refining position and velocity estimates in that platform.

All nodes or platforms operate in the same manner such that the coordinate frames for all nodes converge to a common inertial reference basis for their respective position and velocity estimates, with position and velocity data being exchanged between nodes periodically via their communications link 28. The data which is input to the set of state integrators (SI's) 30 is used as a basis for pointing one or more directive RF millimeter wave beams generated, for example, by the apparatus shown in FIG. 3 to the other nodes in the system.

Figure 5:
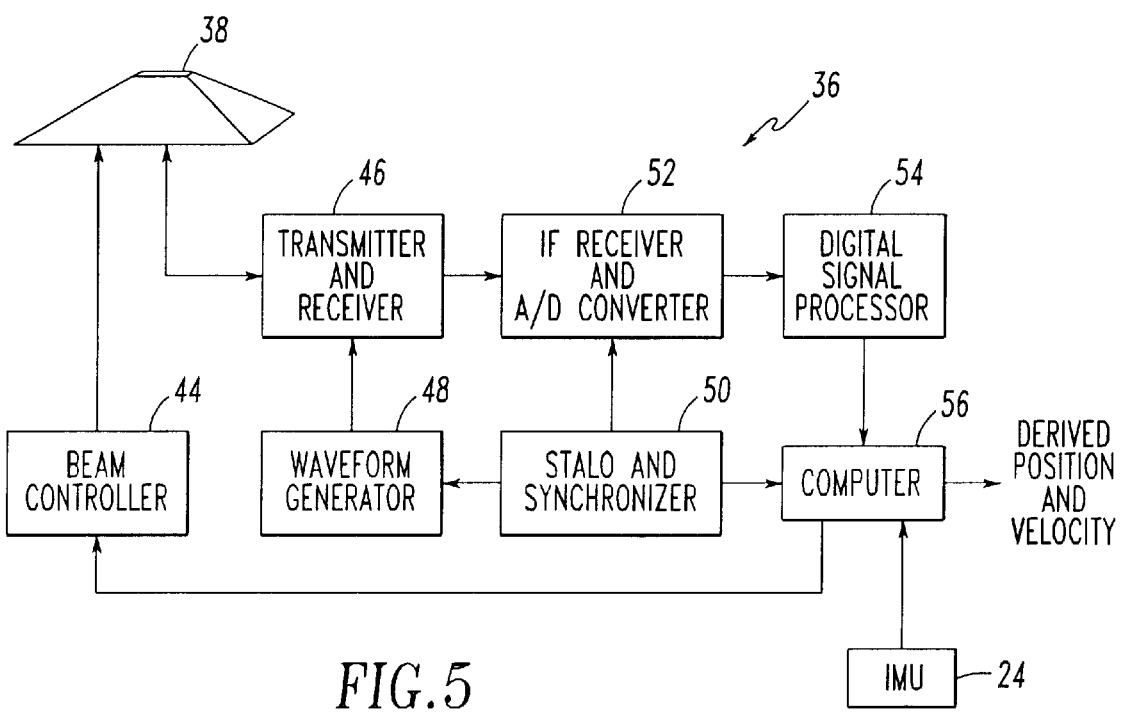
FIG. 5 is an electrical block diagram illustrative of a transponder system for each platform shown in FIG. 1 including an antenna array providing hemispherical coverage.

Communications between the nodes 20 is provided by means of a transponder 36 shown, for example, in FIG. 5. The apparatus shown in FIG. 5 is illustrative of a millimeter wave ($K_a$-band) transponder 36 including a four-faced electronically steered antenna array 38 fabricated by means of an assembly of panels 40 as shown in FIG. 5 which includes a rectangular array of 16 transmit/receive elements 42. The antenna array 38 is capable of providing hemispherical beam coverage and is shown coupled to a beam controller 44 and a transmitter and receiver section 46. The transmitter portion of the section 46 is responsive to the output of a waveform generator 48 connected to a synchronizer portion of a stable local oscillator (STALO) and synchronizer section 50. The receiver portion of the transmitter and receiver section 46 is connected to an IF receiver and A/D converter section 52 which is controlled by a local oscillator portion of the STALO and synchronizer section 50. The output of the IF receiver and A/D converter section 54 is fed to a digital signal processor 54 which couples signals into a digital computer section 56 which includes, among other things, the Kalman filter 22 and the two sets of state integrators 26 and 30 shown in the embodiments depicted in FIGS. 2–4.

In operation, a given node A, for example the aircraft 10 shown in FIG. 1 including a Kalman filter tracking system shown in FIGS. 2 and 3, transmits a coded pulse sequentially to the other nodes B, C and M which re-transmits it back after a set delay. The "sent back" coded pulse is received by the sender, i.e., node A, wherein the range rate, associated with a measurable doppler frequency shift, and the range, associated with a measurable propagation delay are derived. With a Kalman filter tracking system as shown in FIG. 4, range and rate measurements are generated by sending a time message along with the coded pulse so that range associated with the propagation delay can be deduced from its "time of arrival" measured against an internal reference included in the frequency and time reference section 32. The range rate is then measured in an analogous manner by measuring a doppler shift relative to the internal frequency standard in section 32. However, this type of implementation has associated with its severe requirements on frequency and time accuracies of the internal standard. To relieve the accuracy requirements of the internal standard, the time and frequency of the internal standard can be carried as Kalman states and updated along with the platform position and velocity states. Accordingly, the Kalman filter 22 shown in FIG. 4 is also used to correct a time & frequency standard included in section 32 which in turn is used as the time-frequency reference for the waveform generator 34.

Since each node of the system updates its position and velocity computations based upon the range and range rate measurements of one or more other nodes in the system, it may be independent from any other positioning system such as GPS. However, if GPS is available for one or more nodes, a common coordinate system therebetween can be established. Furthermore, the use of directive millimeter wave RF antenna beams provides a number of advantages which include: reduction in jammer-to-signal (J-S) ratio resulting from a jammer generally being in the side lobes of the receiving directive beams due to gain of the transmit and receive directive beams as well as an increased margin in signal-to-noise ratio due to the gain of the directive beams providing greater robustness in communication paths with regard to multi-path and attenuation from foliage. A potential for a much larger ensemble of nodes provides an increased opportunity for achieving minimal set of network connections compared with the number of satellites available for conventional GPS at a given time.

The local area positioning system according to this invention can be implemented with a variety of waveforms such as linear fm modulation, involving up-down linear fm sweeps on alternate pulses, or motion compensated phase coded waveforms to facilitate the range and range rate measurements. Processing could also be implemented using either time or frequency domain matched filter techniques which are well known in the art.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A local area positioning system for providing vehicular navigation within a common spatial reference system, comprising:
    a plurality of networked platforms including air, space and/or ground vehicles communicating with one another by means of directed beams of electromagnetic energy; and,
    wherein each of the platforms includes an identical tracking system which is responsive to on-board range and range rate measurements of predetermined operational parameters, the measurements being not only used by the respective platform, but also communicated to a selected number of other platforms of said plurality of platforms, said platform in return receiving like measurements from said other platforms for calculating and updating a respective navigation state of the respective platform relative to the other platforms.

2. The local area positioning system according to claim 1 wherein said identical type tracking system comprises a Kalman filter tracking system which generates updated estimates of respective platform position, velocity and attitude within said navigation coordinate frame.

3. The local area positioning system according to claim 2 wherein said Kalman filter tracking system includes:
- a set of state integrators for generating state vector estimates of position and velocity of the respective platform in response to inputs from an inertial measurement unit;
- a Kalman filter section for updating the state vector estimates generated by the set of state integrators of the respective platform in response to range and range rate measurements, as well as state vector estimates of position and velocity received from said selected number of other platforms;
- a communications link for coupling state vector estimates, range and range rate measurements between said platforms; and,
- another set of state integrators which receive and update state vector estimates of position and velocity of the respective platform as well as the state vector estimates of position and velocity of said selected number of other platforms for controlling the pointing of said beams of electromagnetic energy to said selected number of other platforms.

4. The local area positioning system according to claim 3 and additionally including a frequency and time reference section for adding a clock bias to the state vector estimates.

5. The local area positioning system according to claim 2 wherein said plurality of platforms operate in a pairwise mode as node pairs by transferring state and covariance estimates to each other when respective on-board measurements are made.

6. The local area positioning system according to claim 5 where the Kalman filter tracking system of each of said platforms or nodes includes a Kalman filter, first and second sets of state integrators for each platform, and a communications link coupling said pair of said platforms whenever pairwise measurements are made, and
- wherein the first set of state integrators has inputs of F and $\dot{\theta}$ from a respective inertial measurement unit and an input of $K[y_{k+1}-H\Phi\hat{x}_k]$ from the Kalman filter, said first set of state integrators generating an output of $\Phi\hat{x}_k$ of the respective, platform of said pair of platforms which is coupled to the communications link,
- wherein the Kalman filter receives inputs of del(t)/del(f), $\Phi\hat{x}_k$ and P generated by the tracking system of the other platform of said pair of platforms and coupled thereto via the communication link,
- the Kalman filter additionally providing an output of P of the respective platform which is fed to the communications link for coupling to said other platform,
- wherein the communications link additionally receiving inputs of $\Phi\hat{x}_k$ and P from said other platform while coupling outputs of del(t)/del(f), $\Phi\hat{x}_k$ and P of the respective platform to said other platform,
- wherein the communications link further couples $\Phi\hat{x}_k$ of at least said one platform and said other platform to the second set of state integrators for generating control signals for controlling the pointing of a beam of electromagnetic energy from said one platform to said other platform, and
- where F is a measurement of specific force on the platform, $\dot{\theta}$ is a measurement of attitude rate of the platform, K represents a matrix of Kalman gains, $y_{k+1}$ represents measurements of range and rate between said pair of platforms at time k+1, H is an observation matrix expressing the relationship between y and $\hat{x}_k$, where $\hat{x}_k$ corresponds to state vector estimates of position, velocity and attitude of a particular platform at time k, $\Phi$ is a state transition matrix used to extrapolate the state estimate $\hat{x}_k$, $\Phi\hat{x}_k$ is the extrapolated state estimate, del(t) corresponds to range, del(f) corresponds to range rate, and P represents a state covariance matrix.

7. The local area positioning system according to claim 6 and additionally including a frequency and time reference section for adding a clock bias to the state vector estimates and receiving del(t) and del(f) inputs from the Kalman filter section for updating and providing corrections to time and frequency standard therein.

8. The local area positioning system according to claim 2 wherein said plurality of platforms operate in a fully coupled mode wherein data is passed between all networked platforms so as to achieve greater accuracy, and wherein respective estimates of platform position, velocity and attitude of all nodes within the common spatial reference system are jointly updated.

9. The local area positioning system according to claim 8 wherein the Kalman filter tracking system of each of said platforms or nodes includes a Kalman filter, first and second sets of state integrators, said first set of state integrators forming a portion of the Kalman filter, and a communications link for mutually coupling all of said platforms together, and
- wherein the first set of state integrators has inputs of F and $\dot{\theta}$ from a respective inertial measurement unit and an input of $K[y_{k+1}-H\Phi\hat{x}_k]$ from the respective Kalman filter, said first set of state integrators generating outputs of $\Phi$ and $\hat{x}_k$ which are coupled to the other node of said node pair as well as all other platforms via the communications link,
- the Kalman filter receiving inputs via the respective communications link of del(t)/del(f), $\Phi$ generated in the Kalman tracking section of all of the other platforms, and $\hat{x}_k$ from the other node of said node pair,
- the communications link receiving additional inputs of $\Phi$ from all the other platforms or nodes including the other node of said node pair, and $\hat{x}_k$ from the other node of said node pair, and coupling outputs of del(t)/del(f), $\Phi$ and $\hat{x}_k$ to all nodes including $\hat{x}_k$ of said one node of the node pair to the other node thereof,
- the communications link further coupling $\Phi\hat{x}_k$ of a predetermined number of said platforms including $\Phi\hat{x}_k$ of said one node of said node pair to the second set of state integrators for generating control signals controlling the pointing of the directed beams of electromagnetic energy from one platform to another,
- where F is a measurement of specific force on a platform, or node, $\dot{\theta}$ is a measurement of attitude rate, K represents a matrix of Kalman gains, $y_{k+1}$ represents measurements of range and rate between platforms at time k+1, H is an observation matrix expressing the relationship between y and $\hat{x}_k$, where $\hat{x}_k$ corresponds to state estimates of position, velocity and attitude at time k, $\Phi$ is a state transition matrix used to extrapolate the state estimate $\hat{x}_k$, $\Phi\hat{x}_k$ is the extrapolated state of estimate, del(t) corresponds to range and del(f) corresponds to range rate measurements of the respective platforms.

10. A local area positioning system for providing vehicular navigation within a common spatial reference system, comprising:

a plurality of networked platforms including air, space and/or ground vehicles communicating with one another by means of directed beams of electromagnetic energy;

wherein each of the platforms includes an identical tracking system which is responsive to on-board range and range rate measurements of predetermined operational parameters, the measurements being not only used by the respective platform, but also communicated to a selected number of other platforms of said plurality of platforms, said platform in return receiving like measurements from said other platforms for calculating and updating a respective navigation stat e of the respective platform relative to the other platforms;

wherein said tracking system comprises a Kalman filter tracking system which generates updated estimates of respective platform position, velocity and attitude within said navigation coordinate frame; and wherein said Kalman filter tracking system includes:

a set of state integrators for generating state vector estimates of position and velocity of the respective platform in response to inputs from an inertial measurement unit;

a Kalman filter section for updating the state vector estimates generated by the set of state integrators of the respective platform in response to range and range rate measurements, as well as state vector estimates of position and velocity received from said selected number of other platforms;

a communications link for coupling state vector estimates, range and range rate measurements between said platforms; and, another set of state integrators which receive and update state vector estimates of position and velocity of the respective platform as well as the state vector estimates of position and velocity of said selected number of other platforms for controlling the pointing of said beams of electromagnetic energy to said selected number of other platforms.

11. A local area positioning system for providing vehicular navigation within a common spatial reference system, comprising:

a plurality of networked platforms including air, space and/or ground vehicles communicating with one another by means of directed beams of electromagnetic energy;

wherein each of the platforms includes an identical tracking system which is responsive to on-board range and range rate measurements of predetermined operational parameters, the measurements being not only used by the respective platform, but also communicated to a selected number of other platforms of said plurality of platforms, said platform in return receiving like measurements from said other platforms for calculating and updating a respective navigation state of the respective platform relative to the other platforms;

wherein each said tracking system comprises a Kalman filter tracking system which generates updated estimates of respective platform position, velocity and attitude within said navigation coordinate frame; and wherein said plurality of platforms operate in a pairwise mode as node pairs by transferring state and covariance estimates to each other when respective on-board range and range rate measurements are made; and where the Kalman filter tracking system of each of said platforms or nodes includes a Kalman filter, first and second sets of state integrators for each platform, and a communications link coupling said pair of said platforms whenever pairwise measurements are made, and wherein the first set of state integrators has inputs of F and $\theta$ from a respective inertial measurement unit and an input of $K[y_{k+1}-H\Phi\hat{x}_k]$ from the Kalman filter, said first set of state integrators generating an output of $\Phi\hat{x}_k$ of the respective platform of said pair of platforms which is coupled to the communications link, wherein the Kalman filter receives inputs of del(t)/del(f), $\Phi\hat{x}_k$ and P generated by the tracking system of the other platform of said pair of platforms and coupled thereto via the communication link, the Kalman filter additionally providing an output of P of the respective platform which is fed to the communications link for coupling to said other platform, wherein the communications link additionally receiving inputs of $\Phi\hat{x}_k$ and P from said other platform while coupling outputs of del(t)/del(f), $\Phi\hat{x}_k$ and P of the respective platform to said other platform, wherein the communications link further couples $\Phi\hat{x}_k$ of at least said one platform and said other platform to the second set of state integrators for generating control signals for controlling the pointing of a beam of electromagnetic energy from said one platform to said other platform, and where F is a measurement of specific force on the platform, $\theta$ is a measurement of attitude rate of the platform, K represents a matrix of Kalman gains, $y_{k+1}$ represents measurements of range and rate between said pair of platforms at time k+1, H is an observation matrix expressing the relationship between y and $\hat{x}_k$, where $\hat{x}_k$ corresponds to state vector estimates of position, velocity and attitude of a particular platform at time k, $\Phi$ is a state transition matrix used to extrapolate the state estimate $\hat{x}_k$, $\Phi\hat{x}_k$ is the extrapolated state estimate, del(t) corresponds to range, del(f corresponds to range rate, and P represents a state covariance matrix.

12. The local area positioning system according to claim 11 and additionally including a frequency and time reference section for adding a clock bias to the state vector estimates and receiving del(t) and del(f) inputs from the Kalman filter section for updating and providing corrections to time and frequency standard therein.

13. A local area positioning system for providing vehicular navigation within a common spatial reference system, comprising:

a plurality of networked platforms including air, space and/or ground vehicles communicating with one another by means of directed beams of electromagnetic energy;

wherein each of the platforms includes an identical tracking system which is responsive to on-board range and range rate measurements of predetermined operational parameters, the measurements being not only used by the respective platform, but also communicated to a selected number of other platforms of said plurality of platforms, said platform in return receiving like measurements from said other platforms for calculating and updating a respective navigation state of the respective platform relative to the other platforms;

wherein said tracking system comprises a Kalman filter tracking system which generates updated estimates of respective platform position, velocity and attitude within said navigation coordinate frame; and wherein said plurality of platforms operate in a fully coupled mode wherein data is passed between all networked platforms so as to achieve greater accuracy, and wherein respective estimates of platform position, velocity and attitude of all nodes within the common spatial reference system are jointly updated; and, wherein the Kalman filter tracking system of each of said platforms or nodes includes a Kalman filter, first and second sets of state integrators, said first set of state integrators forming a portion of the Kalman filter, and a communications link for mutually coupling all of said platforms together, the first set of state integrators have inputs of F and $\theta$ from a respective inertial measurement unit and an input of $K[y_{k+1} - H\Phi\hat{x}_k]$ from the respective Kalman filter, said first set of state integrators generating outputs of $\Phi$ and $\hat{x}_k$ which are coupled to the other node of said node pair as well as all other platforms via the communications link, the Kalman filter receiving inputs via the respective communications link of del(t)/del(f), $\Phi$ generated in the Kalman tracking section of all of the other platforms, and $\hat{x}_k$ from the other node of said node pair, the communications link receiving additional inputs of $\Phi$ from all the other platforms or nodes including the other node of said node pair, and $\hat{x}_k$ from the other node of said node pair, and coupling outputs of del(t)/del(f), $\Phi$ and $\hat{x}_k$ to all nodes including $\hat{x}_k$ of said one node of the node pair to the other node thereof, the communications link further coupling $\Phi\hat{x}_k$ of a predetermined number of said platforms including $\Phi\hat{x}_k$ of said one node of said node pair to the second set of state integrators for generating control signals controlling the pointing of the directed beams-of electromagnetic energy from one platform to another, where F is a measurement of specific force on a platform, or node, $\theta$ is a measurement of attitude rate, K represents a matrix of Kalman gains, $y_{k+1}$ represents measurements of range and rate between platforms at time k+1, H is an observation matrix expressing the relationship between y and $\hat{x}_k$, where $\hat{x}_k$ corresponds to state estimates of position, velocity and attitude at time k, $\Phi$ is a state transition matrix used to extrapolate the state estimate $\hat{x}_k$, $\Phi\hat{x}_k$ is the extrapolated state of estimate, del(t) corresponds to range and del(f) corresponds to range rate measurements of the respective platforms.

* * * * *